United States Patent
Liu et al.

(10) Patent No.: US 10,110,800 B2
(45) Date of Patent: Oct. 23, 2018

(54) METHOD AND APPARATUS FOR SETTING IMAGE CAPTURING PARAMETERS

(71) Applicant: Beijing Xiaomi Mobile Software Co., Ltd., Beijing (CN)

(72) Inventors: Huayijun Liu, Beijing (CN); Tao Chen, Beijing (CN); Ke Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/484,320

(22) Filed: Apr. 11, 2017

(65) Prior Publication Data

US 2017/0366741 A1    Dec. 21, 2017

(30) Foreign Application Priority Data

Jun. 21, 2016 (CN) .......................... 2016 1 0454530

(51) Int. Cl.
*H04N 5/232* (2006.01)
*H04N 1/00* (2006.01)

(52) U.S. Cl.
CPC ..... *H04N 5/23216* (2013.01); *H04N 5/23206* (2013.01); *H04N 5/23222* (2013.01); *H04N 5/23293* (2013.01); *H04N 1/00183* (2013.01)

(58) Field of Classification Search
CPC .......... H04N 1/00183; H04N 5/23222; H04N 5/23206
See application file for complete search history.

(56) References Cited

U.S. PATENT DOCUMENTS

2012/0099012 A1    4/2012    Ryu et al.
2012/0321131 A1*  12/2012    Kobayashi ......... H04N 1/00183
                                                                382/103
(Continued)

FOREIGN PATENT DOCUMENTS

CN    103458190 A    12/2013
CN    103595911 A    2/2014
(Continued)

OTHER PUBLICATIONS

Extended European Search Report of European Application No. 17162435.6-1903, dated Nov. 6, 2017, issued by the European Patent Office (8 pages).

(Continued)

*Primary Examiner* — Ahmed A Berhan
(74) *Attorney, Agent, or Firm* — Finnegan, Henderson, Farabow, Garrett & Dunner LLP

(57) ABSTRACT

The present disclosure relates to a method and apparatus for setting an image capturing parameter of an image capturing device. The method includes acquiring current environment data that corresponds to a current environment and a device parameter of the image capturing device; sending a sample acquiring request to a server, the sample acquiring request including the current environment data and the device parameter; receiving sample data from the server associated with the current environment data and the device parameter, the sample data including one or more sample images; determining a target image capturing parameter based on the one or more sample images; and setting a current image capturing parameter of the image capturing device based on the target image capturing parameter.

16 Claims, 4 Drawing Sheets

(56) References Cited

U.S. PATENT DOCUMENTS

| | | | | |
|---|---|---|---|---|
| 2014/0049652 A1* | 2/2014 | Moon | ................... | H04N 9/8233 |
| | | | | 348/207.1 |
| 2015/0229826 A1* | 8/2015 | Ikeda | ....................... | G03B 7/00 |
| | | | | 348/211.3 |

FOREIGN PATENT DOCUMENTS

| CN | 103929582 A | 7/2014 |
|---|---|---|
| CN | 104065877 A | 9/2014 |
| CN | 104284074 A | 1/2015 |
| CN | 104639837 A | 5/2015 |
| CN | 105554374 A | 5/2016 |
| EP | 2 536 120 A1 | 12/2012 |
| RU | 2376725 C2 | 12/2009 |
| RU | 2389050 C1 | 5/2010 |
| RU | 2536085 C1 | 12/2014 |

OTHER PUBLICATIONS

International Search Report of International Application No. PCT/CN2016/098176, dated Mar. 16, 2017, issued by the State Intellectual Property Office of P.R. China as the ISA (5 pages).

* cited by examiner

METHOD AND APPARATUS FOR SETTING IMAGE CAPTURING PARAMETERS

CROSS-REFERENCE TO RELATED APPLICATIONS

The present application is based upon and claims priority to Chinese Patent Application No. CN201610454530.2, filed Jun. 21, 2016, the entire content of which is incorporated herein by reference.

TECHNICAL FIELD

The present disclosure generally relates to the field of computer technology, and more particularly, to a method and an apparatus for setting an image capturing parameter.

BACKGROUND

With the development of computer technology, users can now capture images including pictures and videos with image capturing devices such as smart cameras. This allows users to record valuable moments in their lives, natural scenery, and other interesting images.

Presently, when a user captures an image (including a picture, a video or the like) with an image capturing device (such as a smart camera), the user can manually set image capturing parameters based on their personal experience and the current environmental conditions. The user can change the image capturing parameters of the image capturing device to improve the resulting image. Currently, the user can only manually set the image capturing parameter according to personal experience with the image capturing device and adjust the image capturing parameter based on the desired image capturing effect until a satisfactory image capturing effect is achieved. This results in a low efficiency. Furthermore, although an image capturing device with an automatic mode can select image capturing parameters automatically, the automatic selection is only made according to a fixed selection rule and may not select an optimal image capturing parameter based on the time, place, and environment.

SUMMARY

According to a first aspect of the present disclosure, there is provided a method for setting an image capturing parameter of an image capturing device comprising: acquiring current environment data that corresponds to a current environment and a device parameter of the image capturing device; sending a sample acquiring request to a server, the sample acquiring request including the current environment data and the device parameter; receiving sample data from the server associated with the current environment data and the device parameter, the sample data including one or more sample images; determining a target image capturing parameter based on the one or more sample images; and setting a current image capturing parameter of the image capturing device based on the target image capturing parameter.

According to a second aspect of the present disclosure there is provided an apparatus for setting an image capturing parameter, comprising: a processor; and a memory for storing instructions executable by the processor; wherein the processor is configured to: acquire current environment data that corresponds to a current environment and a device parameter of an image capturing device; send a sample acquiring request to a server, the sample acquiring request comprising the current environment data and the device parameter; receive sample data from the server associated with the current environment data and the device parameter, the sample data including one or more sample images; determine a target image capturing parameter based on the one or more sample images; and set a current image capturing parameter of the image capturing device based on the target image capturing parameter.

According to a third aspect of the present disclosure, there is provided a non-transitory computer-readable storage medium storing instructions that, when executed by a processor in an apparatus, cause the apparatus to perform a method for setting an image capturing parameter, the method comprising: acquiring current environment data that corresponds to a current environment and a device parameter of an image capturing device; sending a sample acquiring request to a server, the sample acquiring request including the current environment data and the device parameter; receiving sample data from the server associated with the current environment data and the device parameter, the sample data including one or more sample images; determining a target image capturing parameter based on the one or more sample images; and setting a current image capturing parameter of the image capturing device based on the target image capturing parameter.

It shall be understood that both the foregoing general description and the following details are exemplary and explanatory only and may not limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
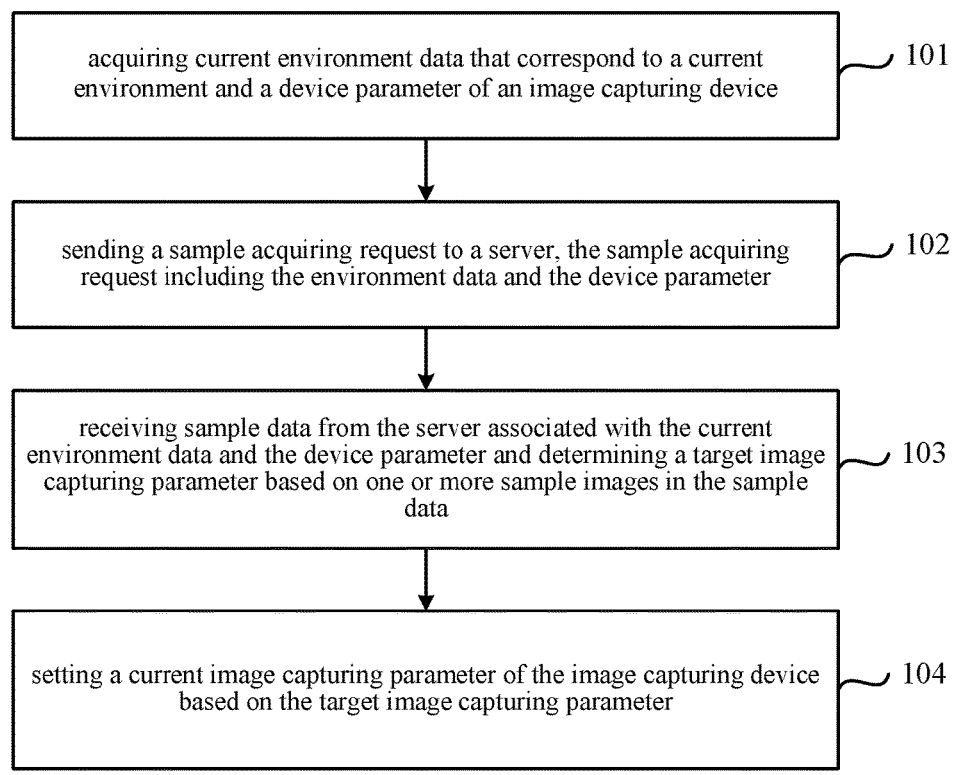
FIG. 1 is a flow chart illustrating a method for setting an image capturing parameter according to an exemplary embodiment.

FIG. 1 is a flow chart illustrating a method for setting an image capturing parameter according to an exemplary embodiment. As shown in FIG. 1, the method for setting an image capturing parameter may be applied in an image capturing device. Referring to FIG. 1, the method includes the following steps.

At step 101, environment data that corresponds to a current environment and a device parameter of an image capturing device are acquired.

At step 102, a sample acquiring request is sent to a server, the sample acquiring request including the environment data and the device parameter.

At step 103, when sample data sent by the server associated with the environment data and the device parameter is received, a target image capturing parameter is determined based on one or more sample images included in the sample data.

At step 104, a current image capturing parameter of the image capturing device is set based on the target image capturing parameter.

In the embodiments of the present disclosure, environment data that corresponds to the current environment and a device parameter of the image capturing device are acquired. Furthermore, a sample acquiring request is sent to a server. Upon receipt of sample data sent by the server, a target image capturing parameter based on the one or more sample images included in the sample data is determined. Lastly, the target image capturing parameter is set as the current image capturing parameter. In this way, since the user does not need to manually set image capturing parameters based on their own experience, the embodiments improve the efficiency of setting an image capturing parameter. Moreover, since the sample data is sent by the server based on the environment data of the current environment and the device parameter of the image capturing device, the target image capturing parameter, which is determined based on the sample data, is consistent with the current environment of the image capturing device and the image capturing parameters supported by image capturing device. As a result, the embodiments improve the efficiency of determining the current image capturing parameter and also improve the captured image.

The device parameter of the image capturing device may include the range of image capturing parameters supported by the image capturing device. Alternatively, the device parameter of the image capturing device may include an identification of the image capturing device itself.

Optionally, determining a target image capturing parameter based on the one or more sample images included in the sample data may further include: displaying the at least one sample image; receiving a selection command that selects one of the displayed one or more sample images; identifying a target sample image selected by the selection command as a target sample image; acquiring an image capturing parameter corresponding to the target sample image; and using the image capturing parameter of the target sample image as the target image capturing parameter.

The sample data may further optionally include image capturing guide information corresponding to each of the one or more sample images. The image capturing guide information provides guidance on capturing an image based on the image capturing parameter of the sample image.

Optionally, after receiving a selection command that selects one of the displayed sample images and identifying a target sample image, the method may further include displaying the image capturing guide information of the target sample image.

Optionally, after using the acquired image capturing parameter as the target image capturing parameter, the method may further include acquiring an image captured by the image capturing device and environment data corresponding to capturing the image. The image may incorporate the image capturing parameter for capturing the image. The method may further include sending the image, including the image capturing parameter, and the environment data for capturing the image to the server. The server stores the image as a sample image corresponding to the environment data and the image capturing parameter used to capture the image.

Optionally, after acquiring an image captured by the image capturing device and environment data for capturing the image, the method may also include: receiving inputted image capturing guide information for the captured image; and sending the inputted image capturing guide information of the image to the server.

The above optional steps can be used in combination with other optional steps of the present disclosure. Therefore, each and every potential combination of the above optional steps will not be described here.

Figure 2:
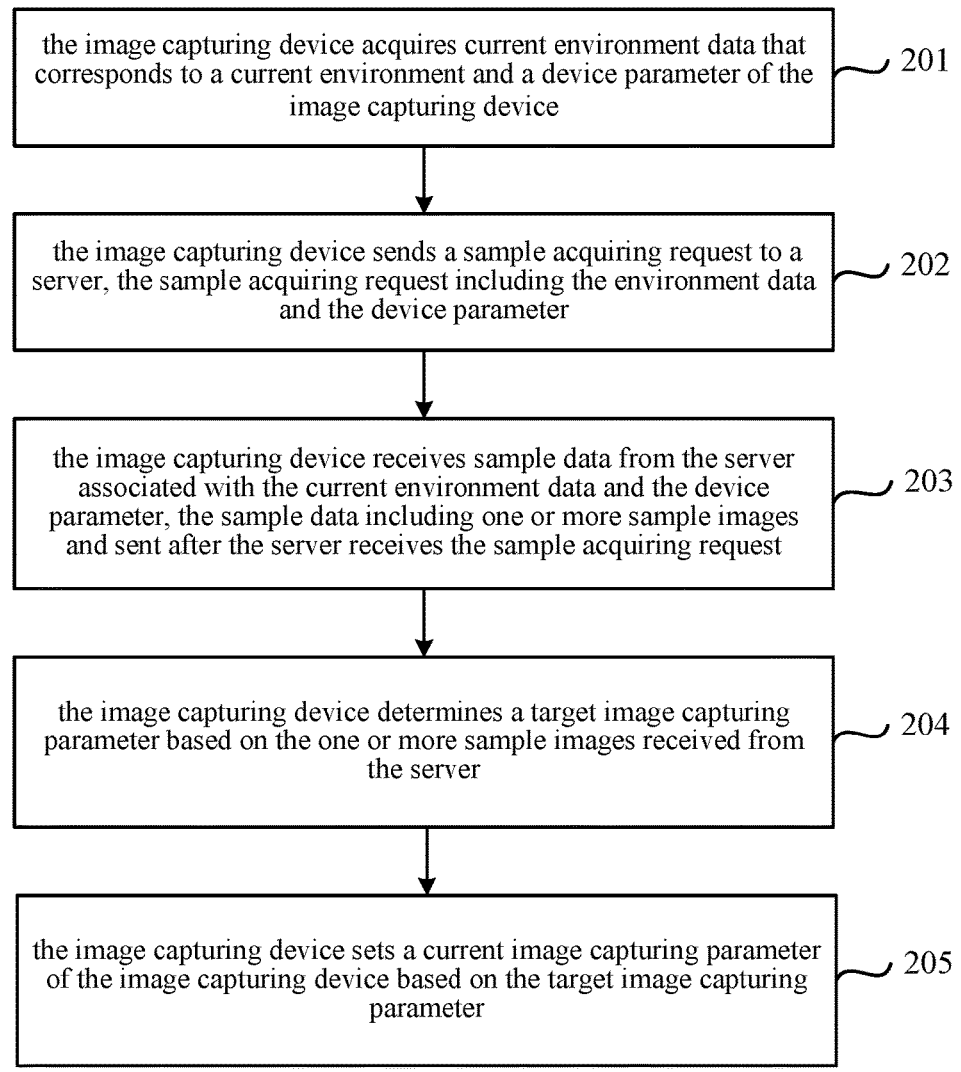
FIG. 2 is a flow chart illustrating another method for setting an image capturing parameter according to an exemplary embodiment.

FIG. 2 is a flow chart illustrating another method for setting an image capturing parameter according to an exemplary embodiment. As shown in FIG. 2, the method for setting an image capturing parameter is applied in an image capturing device and includes the following steps.

At step 201, the image capturing device acquires current environment data corresponding to a current environment and a device parameter of the image capturing device.

Generally, different image capturing devices may have different device parameters. For example, different image capturing devices may support different image capturing parameter ranges. In addition, during the process of capturing an image, different image capturing devices may use different image capturing parameters based on the same environment. Therefore, in order to improve the efficiency and accuracy of setting the image capturing parameter, the image capturing device can use current environment data corresponding to the current environment and the device parameter of the image capturing device.

In the present disclosure, the image capturing device may be any device that is capable of capturing an image and can be connected to a network, such as a smart mobile phone or a smart camera. It should be noted that an image may include a picture or a video and the present disclosure does not specifically limit an image to a picture or a video.

In the present embodiment, the current environment data corresponding to the current environment includes at least one of the following: temperature, humidity, wind direction, wind speed, altitude, barometric pressure, geographical location, weather condition. However, in practical applications, environment data can also include other properties of the current environment and is not specifically limited by the present disclosure.

It should be noted that when the environment data includes a current geographical location, the image capturing device may acquire the current geographical location through satellite positioning technology such as through the Global Positioning System (GPS).

Further, the device parameter of the image capturing device includes the range of image capturing parameters the image capturing device supports or an identification of the device itself.

In certain embodiments, because the image capturing device can include more than one image capturing parameter, the image capturing device may be slow in sending a sample acquiring request. This may be the case when the device parameter of the image capturing device includes the range of image capturing parameters supported by the image capturing device. On the other hand, the range of supported image capturing parameters is generally fixed for a given device. Therefore, to improve the efficiency of sending the sample acquiring request, and in turn, to improve the efficiency in setting the image capturing parameter, the device parameter of the image capturing device can identify the image capturing device itself rather than list the ranges of image capturing parameters supported by the device.

It should be noted that the range of image capturing parameters supported by the image capturing device refers to a range of values that one or more image capturing parameters can be set to. It should also be noted that the image capturing parameter of the image capturing device can be a shutter speed, an aperture value, an International Standards Organization (ISO) light sensitivity, color temperature, exposure compensation, or other parameter. In practical applications, the image capturing parameter of the image capturing device can also include other image capturing parameters such as a focal length, a supported file format, resolution, or the like. This is not specifically limited by the embodiments of the present disclosure.

It should be further noted that the identification of the image capturing device serves the purpose of identifying the image capturing device. The device identification can be a device model number/name, a factory serial number of the image capturing device, or the like. This is not specifically limited by the embodiments of the present disclosure.

Further, the image capturing device may acquire the current environment data corresponding to the current environment upon receipt of an image capturing instruction/command. The image capturing instruction/command can be triggered by a user performing a preset action such as a click, a touch, or the like. However, in practical applications, the preset action can be another action, which is not specifically limited by the embodiments of the present disclosure.

In the embodiment of the present disclosure, as an example, the operation of acquiring the current environment data corresponding to the current environment is triggered by the image capturing device receiving an image capturing instruction. In practical applications, the image capturing device can acquire the current environment data when another event occurs. For example, in one embodiment, the image capturing device can acquire the current environment data corresponding to the current environment upon receipt of an image capturing parameter acquiring instruction. This is not specifically limited by the embodiments of the present disclosure.

It should be noted that the image capturing parameter acquiring instruction can be triggered by a preset action performed by a user when the user comes across an interesting scene.

For example, the current environment data corresponding to the current environment acquired by the image capturing device can be: Xi'an Bell Tower in Shanxi, sunny, and 35° C. The image capturing parameter range that the image capturing device supports can be acquired as: a range of shutter speeds (1 second, ½ second, ¼ second, ⅛ second, $\frac{1}{15}$ second, $\frac{1}{30}$ second, $\frac{1}{60}$ second, $\frac{1}{125}$ second, $\frac{1}{250}$ second, $\frac{1}{500}$ second, $\frac{1}{1000}$ second and $\frac{1}{2000}$ second), a range of aperture values (f1, f2, f4, f8, f16, f32 and f64), and a range of ISO light sensitivity (100, 200, 400, 800, 1600 and 3200).

At step 202, the image capturing device sends a sample acquiring request to a server, the sample acquiring request includes the environment data and the device parameter.

When the environment is the same, the image captured by the image capturing device can be the same but with different image capturing parameters. Therefore, the image capturing device can send a sample acquiring request to the server to acquire a sample image consistent with the environment data of the current environment and the device parameter of the image capturing device. Thereafter, the image capturing parameter of the image capturing device can be set based upon the acquired sample image.

It should be noted that before sending the sample acquiring request to the server, the image capturing device may establish a connection with the server. A connection may be established, for example, through Bluetooth, Wireless Fidelity (WIFI), or the like. The device may then send the sample acquiring request to the server through the established connection. However, in practical applications, the image capturing device can also establish a connection with the server by other means, which are not specifically limited by the embodiments of the present disclosure.

Further, as described above, the device parameter of the image capturing device included in the sample acquiring request can include the image capturing parameter range that the image capturing device supports or an identification of the image capturing device itself. Therefore, if the device parameter is an identification of the image capturing device, upon receipt of the sample acquiring request, the server can determine the image capturing parameter range that the image capturing device supports based on the identification of the device.

It should be noted that, before receiving the sample acquiring request, the server may store device information (including identification information) for various image capturing devices. The device information may include the corresponding image capturing parameter ranges that each of the image capturing devices respectively supports. Subsequently, upon receipt of a sample acquiring request that includes an identification of a device, the server can determine the corresponding image capturing parameter range that the image capturing device supports based on the device identification included in the sample acquiring request.

Further, as noted above, the image captured by the image capturing device can be a picture or a video. The image capturing parameter used to capture a video can be different from that used to capture a picture. If the image capturing device captures a video using an image capturing parameter intended for capturing a picture, the effect of the parameter may be undesired. Therefore, in order to improve the accuracy of setting the image capturing parameter and the resulting image capturing effect, the sample acquiring request can include the type of sample image requested (which can include a picture or a video) to indicate to the server which type of sample image the server should send.

At step 203, upon receipt of the sample acquiring request, the server can send sample data to the image capturing device based on the environment data and the device parameter. The sample data includes at least one sample image.

The server stores various sample images. The server also stores image capturing parameters used to capture the images and environment data corresponding to each sample image. Therefore, upon receipt of the sample acquiring request, the server sends sample data to the image capturing device associated with the environment data and the device parameter included in the sample acquiring request. As noted above, the sample data includes at least one sample image.

In order to ensure that the image capturing device can set its image capturing parameter based on the sample data and to further improve the accuracy and effectiveness of setting the image capturing parameter, for each sample image: (1) the environment data corresponding to the sample image can be the same as the environment data included in the sample acquiring request; (2) the number of image capturing parameters associated with capturing the sample image can be the same as the number of image capturing parameters included in the sample acquiring request; and (3) each image capturing parameter value used to capture the sample image is supported by the image capturing device.

It should be noted that the server can receive images from various devices (source devices) and the environment data corresponding to those images. Moreover, an image sent by a source device generally will carry an image capturing parameter used to capture the image. Therefore, the server can store the received image as a sample image corresponding to the received image capturing parameter and the received environment data corresponding to that capturing the image.

It should be also noted that, a source device is a device that establishes a connection with the server and stores at least one sample image on the server, along with an associated image capturing parameter and corresponding environment data. The source device can be a computer, a smart mobile phone, a smart camera or the like. This is not specifically limited by the embodiments of the present disclosure.

Further, in order to improve the efficiency of the server sending sample data to the image capturing device based on the received environment data and the image capturing parameter range of the image capturing device, the server can acquire a sample image according to corresponding relationships between sample identifications (IDs) of stored sample images, image capturing parameters, and environment data. For example, the server can acquire a sample image with (1) the same environment data as that included in the sample acquiring request, (2) the same number of image capturing parameters as that included in the sample acquiring request, and (3) an image capturing parameter that falls within the image capturing parameter range included in the sample acquiring request.

In the embodiment, each sample ID uniquely identifies one sample image stored on the server. The sample ID can be determined by the server before the server stores the corresponding sample image according to a corresponding relationship between the sample ID the corresponding image capturing parameter, and the corresponding environment data.

For example, when the server receives a sample acquiring request 1 which includes the following. (1) Environment data 1: Xi'an Bell Tower in Shanxi, sunny, 35° C.; (2) an image capturing parameter range 1, which the image capturing device includes in the sample acquiring request 1: (a) the supported range of shutter speeds is 1 second, ½ second, ¼ second, ⅛ second, ¹⁄₁₅ second, ¹⁄₃₀ second, ¹⁄₆₀ second, ¹⁄₁₂₅ second, ¹⁄₂₅₀ second, ¹⁄₅₀₀ second, ¹⁄₁₀₀₀ second and ¹⁄₂₀₀₀ second, (b) the supported range of aperture values is f1, f2, f4, f8, f16, f32 and f64, and (c) the supported range of ISO light sensitivity is 100, 200, 400, 800, 1600 and 3200. In this case, based on the relationships between sample IDs, the image capturing parameters, and the environment data (as shown in Table One), the server can acquire three sample images, i.e. sample image 1, sample image 3 and sample image 4. The server sets the three sample images collectively as sample data 1, based on the environment data 1 and the image capturing parameter range 1.

TABLE ONE

| Sample ID | Image Capturing Parameters | Environment data |
|---|---|---|
| Sample Image 1 | shutter speed is 1 sec, aperture value is f1, and ISO light sensitivity is 100 | Xi'an Bell Tower in Shanxi, sunny, 35° C. |
| Sample Image 2 | shutter speed is ⅛ sec, aperture value is f16, and ISO light sensitivity is 200 | Beijing Tiananmen Square, sunny, 30° C. |
| Sample Image 3 | shutter speed is ¹⁄₁₅ sec, aperture value is f16, and ISO light sensitivity is 200 | Xi'an Bell Tower in Shanxi, sunny, 35° C. |
| Sample Image 4 | shutter speed is ¼ sec, aperture value is f16, and ISO light sensitivity is 800 | Xi'an Bell Tower in Shanxi, sunny, 35° C. |
| Sample Image 5 | shutter speed is ¼ sec, aperture value is f16, and ISO light sensitivity is 3200 | Xi'an Bell Tower in Shanxi, rainy, 24° C. |
| Sample Image 6 | shutter speed is ¹⁄₄₀₀₀ sec, aperture value is f16, and ISO light sensitivity is 3200 | Xi'an Bell Tower in Shanxi, sunny, 35° C. |
| . . . | . . . | . . . |

It should be noted that, in the embodiment of the present disclosure, the above Table One is only an example of the corresponding relationships between the sample IDs, the image capturing parameters, and the environment data, and are not intended to limit the embodiment of the present disclosure.

It should also be noted that before the server sends sample data to the image capturing device based on the received environment data and the image capturing parameter range included in the sample acquiring request, the server can store various sample images, along with image capturing parameters and environment data respectively used to capture each of the sample images. The server can store this information with the corresponding relationships between the sample ID, the image capturing parameters, and the environment data.

To capture an image based on a sample image conveniently, and in order to improve the effectiveness of capturing an image, the sample data can also include image capturing guide information for each of the sample images. The image capturing guide information is for the purpose of guiding the user in capturing an image based on the image capturing parameter of the sample image.

In the embodiment, for each of the one or more sample images, the corresponding image capturing guide information can be a description of the image capturing parameters used to capture the sample image. However, in practical applications, the image capturing guide information can also be other information about the sample image. For example, it may include the composition of the sample image, and so on. This is not specifically limited in the embodiment of the present disclosure.

It should be noted that, for each of the sample images, the image capturing guide information of the sample image can be determined by the source device used to capture the sample image, which sends the sample image based on received information input by the user about the sample image. Upon receipt of the information input by the user, the source device sets the received information as the image capturing guide information of the sample image, and sends the image capturing guide information of the sample image to the server. Upon receipt of the image capturing guide information of the sample image, the server stores the image capturing guide information in association with the sample image.

Further, since the image capturing parameter for capturing a picture is generally different from the image capturing parameter for capturing a video, in order to improve the accuracy of setting the image capturing parameter, when the sample acquiring request includes the desired type of sample image, the server sends to the image capturing device sample data that includes sample images of only the appropriate type.

At step 204, upon receipt of the sample data sent by the server based on the environment data and the device parameter, the image capturing device determines a target image capturing parameter based on the one or more sample images included in the sample data.

Since the sample data is sent by the server based on the environment data and the device parameter, for each of the one or more sample images included in the sample data, the environment data for capturing the sample image is the same as the current environment of the image capturing device, and the image capturing parameter corresponding to the sample image is consistent with the image capturing parameter range of the image capturing device. Therefore, the target image capturing parameter can be determined based on the one or more sample images included in the sample data.

In the embodiment, the operation, performed by the image capturing device, of determining a target image capturing parameter based on the at least one sample image included in the sample data can include: displaying the at least one sample image; upon receipt of a selection command that selects one of the displayed sample images, identifying a sample image selected by the selection command as the target sample image; acquiring an image capturing parameter corresponding to the target sample image; and using the acquired image capturing parameter of the target sample image as the target image capturing parameter.

It should be noted that the selection command can be triggered by a preset action performed by the user.

It should be further noted that, since a sample image generally includes the image capturing parameter for capturing the sample image, the image capturing device can acquire the image capturing parameter of the target sample image from the target sample image. However, in practical applications, the image capturing device can acquire the image capturing parameter of the target sample image in other ways. For example, in another possible implementation, the server can cause the sample data to include an image capturing parameter for each of the sample images. As a result, the image capturing device can acquire the image capturing parameter of the target sample image from the sample data.

For example, the image capturing device receives sample data 1, which includes three sample images: a sample image 1, a sample image 3 and a sample image 4. The image capturing device receives a selection command based on the three sample images that selects the sample image 1. In this case, the sample image 1 is identified as the target sample image, and the image capturing parameter included in the sample image 1 is acquired from the sample image 1. That is, the shutter speed is 1 sec, the aperture value is f1, and the ISO light sensitivity is 100. Then, the image capturing parameter, i.e. the shutter speed of 1 sec, the aperture value of f1, and the ISO light sensitivity of 100, is used as the target image capturing parameter.

Further, in order to improve the image capturing effect in capturing an image and improve the efficiency in capturing an image based on a target sample image and a target image capturing parameter, in the case where sample data also includes image capturing guide information corresponding to teach of the sample images, the image capturing device can also display the image capturing guide information corresponding to the target sample image.

In the embodiment, the image capturing device can display the image capturing guide information of the target sample image through a box, a pop-out window, or in other ways. However, in practical applications, the image capturing device can also display the image capturing guide information of the target sample image through other means, which are not specifically limited by the embodiments of the present disclosure.

At step 205, the image capturing device sets a current image capturing parameter of the image capturing device based on the target image capturing parameter.

Since the environment data of the target sample image is the same as the environment data of the image capturing device, and the target image capturing parameter is also within the image capturing parameter range supported by the image capturing device, the image capturing device can accurately set its current image capturing parameter to the target image capturing parameter, improving the effect of capturing an image.

Further, as the server stores an increasing number of sample images, the sample data sent by the server will also include an increasing number of sample images, which improves the accuracy of setting an image capturing parameter. In order to increase the number of the sample images stored on the server, the image capturing device can acquire the image captured by the image capturing device and the environment data corresponding to the captured image. The image may include the image capturing parameter for capturing the image. Then, the image capturing device can send the image and the corresponding environment data to the server so that the server stores the image as a sample image corresponding to the corresponding environment data and the image capturing parameter used to capture the image.

In the embodiment, the image capturing device can acquire the image captured by the image capturing device and the corresponding environment data through one of the following two implementations.

In a first implementation, at a preset time period, the image capturing device sends to the server all the images captured during the preset time period before and closest to the current time along with the environment data corresponding to the images. In the first implementation, the image capturing device reduces the frequency of communication with the server and saves power for the image capturing device.

It should be noted that the preset time period can be determined before the image capturing device acquires images and their corresponding environment data. The preset time period can be 3 hours or 5 hours. However, in practical applications, the preset time period can be other values, which are not specifically limited by the embodiments of the present disclosure.

In a second implementation, when the image capturing device captures an image, the image capturing device acquires the captured image and the corresponding environment data and immediately sends the image and the environment data to the server. The second implementation ensures that the image capturing device timely sends the captured image and the environment data to the server when the device captures the image. It can improve the efficiency of sending the image and the corresponding environment data to the server.

Further, in order to describe the capture of the image, the image capturing device can also receive image capturing guide information corresponding the image. The guide information is input into the image capturing device and sent to the server.

In the embodiment, the image capturing device can display an input prompting message upon receiving the image to prompt the user to input image capturing guide information corresponding to the image. After receiving the image capturing guide information, which is entered by the user, the image capturing device sends the image capturing guide information to the server.

It should be noted that, the image capturing device can display the input prompting message through a box, a pop-out window, or in other ways. However, in practical applications, the image capturing device can also display the input prompting message through other means, which are not specifically limited by the embodiments of the present disclosure.

It should be further noted that the image capturing device can simultaneously send the image captured by the image capturing device, the environment data corresponding to the image, and the image capturing guide information corresponding to the image to the server. Alternatively, the device can also send the image capturing guide information of the image to the server separately. This is not specifically limited by the embodiments of the present disclosure.

In the embodiments of the present disclosure, the image capturing device can acquire environment data corresponding to the current environment and a device parameter of the image capturing device; send a sample acquiring request to a server; upon receipt of sample data sent by the server, determine a target image capturing parameter based on at least one sample image included in the sample data and set the target image capturing parameter as the current image capturing parameter. In this way, since the user does not need to manually set parameters based on experience, the process of setting an image capturing parameter is improved. Moreover, since the sample data is sent by the server based on the environment data of the current environment and the device parameter of the image capturing device, the target image capturing parameter determined based on the sample data is consistent with the current environment of the image capturing device and the image capturing parameters supported by the device. This can improve the efficiency of determining the current image capturing parameter and improve the image capturing effect of capturing an image. In addition, the sample data includes at least one sample image, and the image capturing device can select a target sample image from the at least one sample image based on a received selection command, and set the image capturing parameter of the target sample image as the target image capturing parameter. That is, a target sample image, and in turn, a target image capturing parameter can be accurately selected as desired. This can further improve the accuracy of determining the current image capturing parameter and improve the image capturing effect of capturing an image with the image capturing device. Further, the sample data also includes image capturing guide information corresponding to each of the sample images. In this way, after the target sample image is selected and the current image capturing parameter is set, the process of capturing an image can be adjusted accurately based on the image capturing guide information of the target sample image. This can further improve the image capturing effect of capturing an image with the image capturing device.

Figure 3:
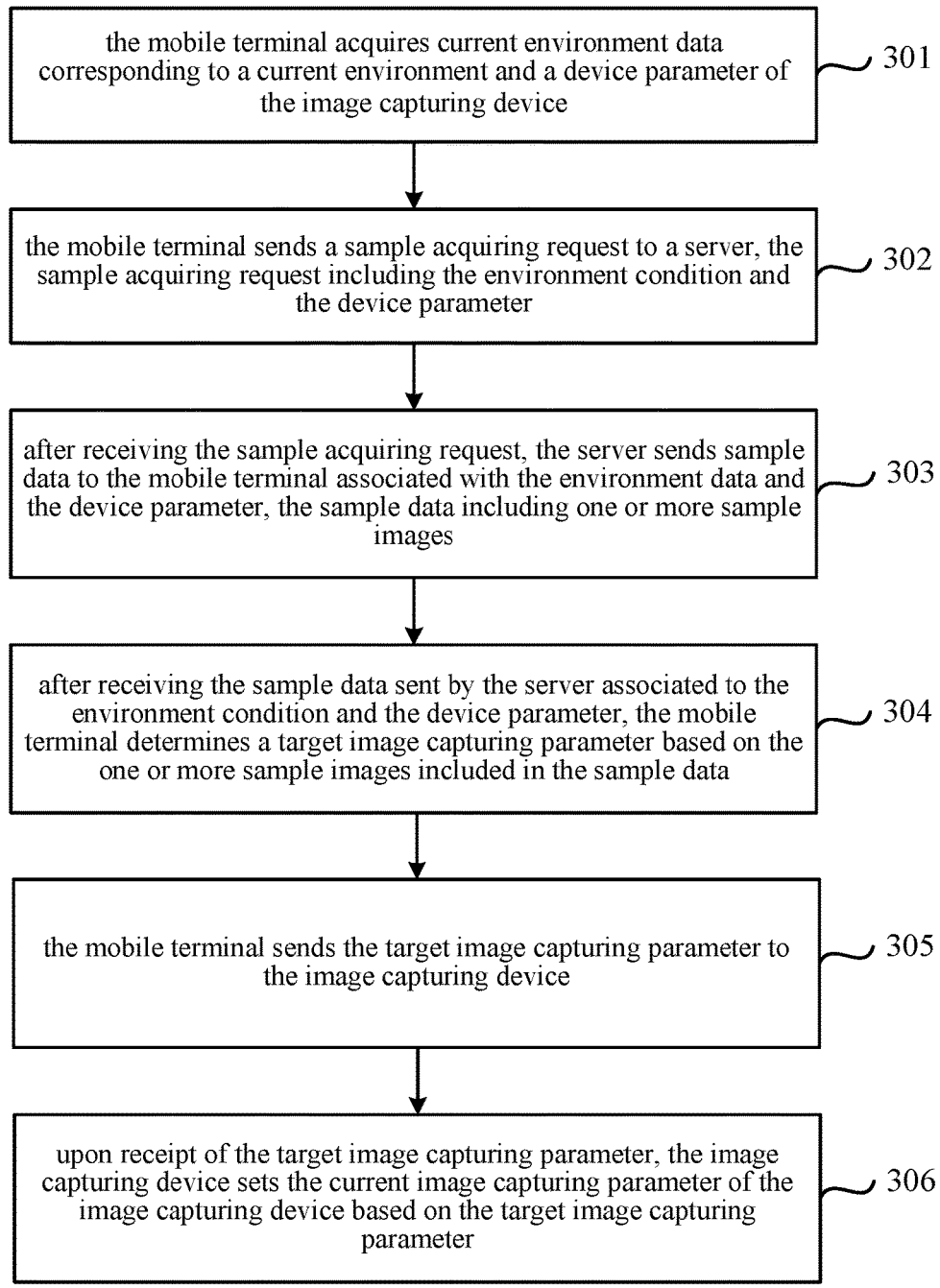
FIG. 3 is a flow chart illustrating yet another method for setting an image capturing parameter according to an exemplary embodiment.

FIG. 3 is a flow chart illustrating a method for setting an image capturing parameter according to an exemplary embodiment. As shown in FIG. 3, the method for setting an image capturing parameter is applied in communication between an image capturing device and a mobile terminal and includes the following steps.

At step 301, the mobile terminal acquires current environment data corresponding to a current environment and a device parameter of the image capturing device.

In the embodiment, the mobile terminal may be a terminal that is capable of establishing communication with the server such as a smart mobile phone, a tablet computer, a smart watch, or the like. The image capturing device may be a device that is capable of capturing an image such as a smart camera.

It should be noted that, in order to improve the accuracy of acquiring the current environment data corresponding to the environment the mobile is located in, the mobile terminal can be located in the same scene as the image capturing device. For example, the mobile terminal can be in the same Local Area Network (LAN) with the image capturing device. Alternatively, the mobile terminal can be within a preset range of the image capturing device. This is not specifically limited by the embodiments of the present disclosure.

It should be further noted that, the preset range can be a circular area with a radius of 50 meters with the image capturing device at the center of the circle. However, in practical applications, the preset range can also be determined based on the application. This is not specifically limited by the embodiments of the present disclosure.

Further, the device parameter of the image capturing device includes an image capturing parameter range supported by image capturing device or an identification of the image capturing device itself.

In addition, the mobile terminal can acquire the current environment data of a current environment and a device parameter of the image capturing device in one of two ways.

In a first way, the mobile terminal can acquire current environment data and a device parameter of the image capturing device upon receipt of an image capturing parameter acquiring request sent by the image capturing device.

In the embodiment, in order to reduce the frequency of communication between the mobile terminal and the image capturing device, and in turn, to improve the efficiency of setting an image capturing parameter, the device parameter of the image capturing device can be included in the image capturing parameter acquiring request.

In a second way, the mobile terminal can acquire current environment data and a device parameter of the image capturing device upon receipt of an image capturing parameter acquiring instruction.

It should be noted that, the image capturing parameter acquiring instruction can be triggered by a user performing a preset action such as a click, a touch or the like. However, in practical applications, the preset action can be another action, which is not specifically limited by the embodiments of the present disclosure.

Further, in the second way, the operation of the mobile terminal acquiring a device parameter of the image capturing device can include: the mobile terminal sending a device-parameter acquiring request to the image capturing device, and the image capturing device sending the device parameter of the image capturing device to the mobile terminal upon receipt of the device-parameter acquiring request.

In the embodiment, the mobile terminal can establish connection with the image capturing device through Bluetooth, Wireless Fidelity (WIFI) or the like, and then send to the image capturing device the device-parameter acquiring request through the established connection. However, in practical applications, the mobile terminal can also establish a connection with the image capturing device in other ways and thereafter send the device-parameter acquiring request to the image capturing device. This is not specifically limited by the embodiments of the present disclosure.

It should be noted that, in practical applications, the mobile terminal can also acquire the device parameter of the image capturing device in other ways. For example, in one implementation, in the case where the device parameter sent by the image capturing device includes an identification of the device, the mobile terminal can acquire the device identification by scanning a two-dimensional code or a bar code on the image capturing device. This is not specifically limited by the embodiments of the present disclosure.

At step 302, the mobile terminal sends a sample acquiring request to a server, the sample acquiring request including the environment data and the device parameter.

It should be noted that, the operation of the mobile terminal sending a sample acquiring request can be similar to the operation of the image capturing device sending a sample acquiring request to the server at the above step 202, and will not be repeated here.

At step 303, upon receipt of the sample acquiring request, the server can send sample data to the mobile terminal based on the environment data and the device parameter, the sample data including at least one sample image.

It should be noted that, at step 303, the operation of the server sending sample data to the mobile terminal based on the environment data and the device parameter can be similar to the operation of the server sending sample data to the image capturing device based on the environment data and the device parameter at the above step 203, and will not be repeated here.

Further, the sample data can also include image capturing guide information corresponding to each of sample images. The image capturing guide information is for the purpose of guiding the user in capturing an image based on the image capturing parameter of the sample image.

At step 304, upon receipt of the sample data sent by the server based on the environment data and the device parameter, the mobile terminal determines a target image capturing parameter based on the one or more sample images included in the sample data.

It should be noted that, at step 304, the operation of the mobile terminal determining a target image capturing parameter based on the one or more sample images included in the sample data can be similar to the operation of the image capturing device determining a target image capturing parameter based on the one or more sample images included in the sample data at the above step 204, and will not be repeated here.

Further, the mobile terminal can display the one or more sample images; upon receipt of a selection command that selects a sample image, determine the sample image selected by the selection command as the target sample image; acquire an image capturing parameter corresponding to the sample image; and use the image capturing parameter of the sample image as the target image capturing parameter.

In addition, in the case where the sample data also includes image capturing guide information corresponding to each of the sample images, the mobile terminal can also display the image capturing guide information corresponding to the target sample image.

In the embodiment, since the image capturing device generally has limited storage space for storing captured images, the sample images and the image capturing guide information corresponding to the target sample image can be instead displayed by the mobile terminal.

At step 305, the mobile terminal sends the target image capturing parameter to the image capturing device.

It can be seen from the above that, the mobile terminal can establish a connection with the image capturing device through Bluetooth, Wireless Fidelity (WIFI), or the like. Therefore, the mobile terminal can send the target image capturing parameter to the image capturing device through the established connection.

Further, the mobile terminal can acquire images captured by the image capturing device and the corresponding environment data, with each image including an image capturing parameter used to capture the image. Then, the mobile terminal can send the image and the corresponding environment data to the server, for the server to store as a sample image corresponding to the corresponding environment data and image capturing parameter.

In the embodiment, the operation of the mobile terminal acquiring the image captured by the image capturing device and the corresponding environment data can include: at a preset time period, the mobile terminal sends to the image capturing device an image acquiring request which includes time information, and upon receipt of the image acquiring request, the image capturing device sends to the mobile terminal all images captured during a designated time period corresponding to the time information along with corresponding environment data.

It should be noted that time information is used to designate a time period. The time information can be determined before the mobile terminal sends the image acquiring request to the image capturing device. The designated time period can be any time period before the current time. For example, the designated time period can be Jun. 6, 2016 to Jun. 7, 2016. This is not specifically limited by the embodiments of the present disclosure.

Further, the mobile terminal can also receive image capturing guide information corresponding to the image. The guide information is input into the mobile terminal and sent by the terminal to the server.

At step 306, upon receipt of the target image capturing parameter, the image capturing device sets the current image capturing parameter of the image capturing device based on the target image capturing parameter.

It should be noted that, at step 306, the operation of the image capturing device setting the current image capturing parameter of the image capturing device based on the target image capturing parameter can be similar to the operation of the image capturing device setting the current image capturing parameter of the image capturing device based on the target image capturing parameter discussed above and will not be repeated here.

In the embodiments of the present disclosure, the mobile terminal can acquire current environment data corresponding to the current environment and a device parameter of the image capturing device; send a sample acquiring request to a server; upon receipt of sample data sent by the server, determine a target image capturing parameter based on at least one sample image included in the sample data, send the target image capturing parameter to the image capturing device to instruct the image capturing device to set the target image capturing parameter as the current image capturing parameter. In this way, since the user does not need to manually set parameters based on experience, the efficiency of setting an image capturing parameter is improved. Moreover, since the sample data is sent by the server based on the environment data of the current environment and the device parameter of the image capturing device, the target image capturing parameter determined by the sample data is consistent with the current environment of the image capturing device. Furthermore, the image capturing device can support the target image capturing parameter. This can improve the efficiency of determining the current image capturing parameter and improve the image capturing effect of capturing an image.

Figure 4:
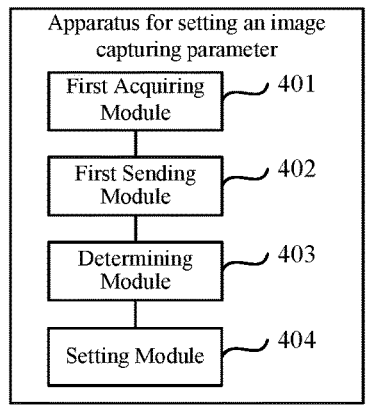
FIG. 4 is a block diagram illustrating an apparatus for setting an image capturing parameter according to an exemplary embodiment.

FIG. 4 is a block diagram illustrating an apparatus for setting an image capturing parameter according to an exemplary embodiment. As shown in FIG. 4, the apparatus includes a first acquiring module 401, a first sending module 402, a determining module 403, and a setting module 404.

The first acquiring module 401 is configured to acquire current environment data corresponding to a current environment and an image capturing parameter range supported by an image capturing device.

The first sending module 402 is configured to send a sample acquiring request to a server, the sample acquiring request including the environment data and the image capturing parameter range.

The determining module 403 is configured to, upon receipt of sample data sent by the server based on the environment data and the image capturing parameter range, determine a target image capturing parameter based on one or more sample images included in the sample data.

The setting module 404 is configured to set the current image capturing parameter of the image capturing device based on the target image capturing parameter.

Optionally, the device parameter of the image capturing device includes the image capturing parameter range supported by the image capturing device or an identification of the image capturing device itself.

Optionally, the determining module 404 includes: a first displaying unit configured to display the one or more sample images; a first determining unit configured to, upon receipt of a selection command that selects one of the displayed sample images, identify a sample image selected by the selection command as a target sample image; an acquiring unit configured to acquire an image capturing parameter of the target sample image; and a second determining unit configured to use image capturing parameter of the target sample image as the target image capturing parameter.

Optionally, the sample data further includes image capturing guide information corresponding to each of the sample images, the image capturing guide information for the purpose of guiding the capture of an image based on the image capturing parameter of the sample image.

Optionally, the determining module 404 further includes a second displaying unit configured to display the image capturing guide information of the target sample image.

Optionally, the apparatus further includes: a second acquiring module configured to acquire an image captured by the image capturing device and corresponding environment data for capturing the image, the image including an image capturing parameter for capturing the image; and a second sending module configured to send the image and the corresponding environment data to the server, for the server to store as a sample image corresponding to the environment data and the image capturing parameter.

Optionally, the apparatus further includes: a receiving module configured to receive inputted image capturing guide information for the image; and a third sending module configured to send the image capturing guide information to the server.

In the embodiments of the present disclosure, it is possible to acquire current environment data corresponding to the current environment and a device parameter of the image capturing device; send a sample acquiring request to a server; upon receipt of sample data sent by the server, determine a target image capturing parameter based on at least one sample image included in the sample data and set the target image capturing parameter as the current image capturing parameter. In this way, since the user does not need to manually set parameters based on experience, the efficiency of setting an image capturing parameter is improved. Moreover, since the sample data is sent by the server based on the current environment data and the device parameter of the image capturing device, the target image capturing parameter determined based on the sample data is consistent with the current environment of the image capturing device and the image capturing parameters supported by the image capturing device. This can improve the efficiency of determining the current image capturing parameter and improve the image capturing effect of capturing an image with the image capturing device.

Figure 5:
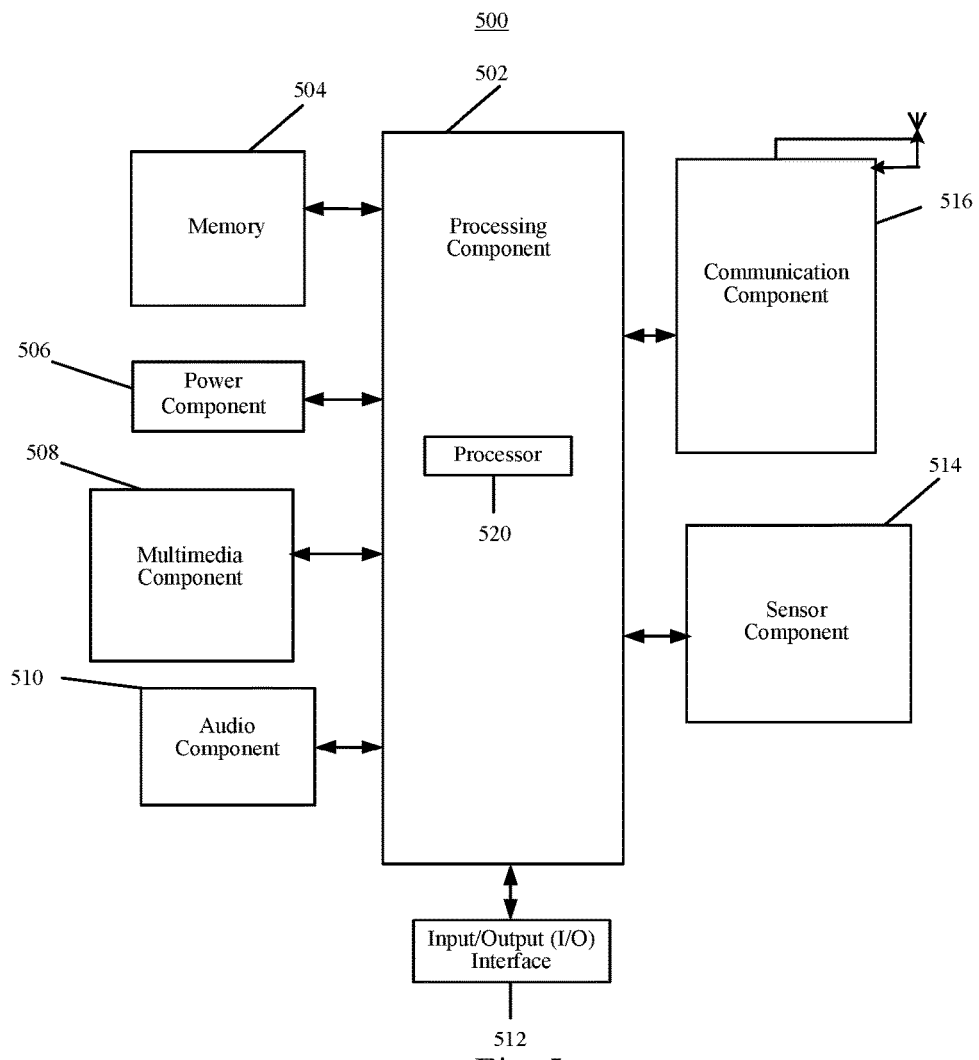
FIG. 5 is a block diagram illustrating another apparatus for setting an image capturing parameter according to an exemplary embodiment.

With respect to the apparatuses in the above embodiments, the specific manner of performing operations for individual modules therein have been described in detail in the embodiments regarding the relevant methods, and will not be repeated here FIG. 5 is a block diagram illustrating another apparatus 500 for setting an image capturing parameter based on an exemplary embodiment. For example, the apparatus 500 can be an image capturing device, a mobile phone, a computer, a digital broadcast terminal, a messaging device, a tablet, a personal digital assistant, or the like.

Referring to FIG. 5, the apparatus 500 can include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the apparatus 500, such as operations associated with a display, telephone calls, data communications, camera operations, and recording operations. The processing component 502 can include one or more processors 520 to execute instructions that perform all or part of the steps in the above described methods. Moreover, the processing component 502 can include one or more modules which facilitate the interaction between the processing component 502 and other components. For instance, the processing component 502 can include a multimedia module to facilitate the interaction between the multimedia component 508 and the processing component 502.

The memory 504 is configured to store various types of data that support the operation of apparatus 500. Examples of such data include instructions for any applications or methods used on the apparatus 500, contact data, phonebook data, messages, pictures, video, etc. The memory 504 can be implemented using any type of volatile or non-volatile memory, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 506 provides power to various components of the apparatus 500. The power component 506 can include a power management system, one or more power sources, and any other components associated with the generation, management, and distribution of power in the apparatus 500.

The multimedia component 508 includes a screen providing an output interface between the apparatus 500 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 508 includes a front camera and/or a rear camera. The front camera and the rear camera can receive an external multimedia datum while the apparatus 500 is in an operation mode, such as a picture capturing mode or a video mode. Each of the front camera and the rear camera can be a fixed optical lens system or have focus and optical zoom capability.

The audio component 510 is configured to output and/or input audio signals. For example, the audio component 510 includes a microphone ("MIC") configured to receive an external audio signal when the apparatus 500 is in an operation mode, such as a call mode, a recording mode, and a voice recognition mode. The received audio signal can be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons can include, but are not limited to, a home button, a volume button, a starting button, and a locking button.

The sensor component 514 includes one or more sensors to provide status assessments of various aspects of the apparatus 500. For instance, the sensor component 514 can detect an open/closed status of the apparatus 500, relative positioning of components, e.g., the display and the keypad, of the apparatus 500, a change in position of the apparatus 500 or a component of the apparatus 500, a presence or absence of user contact with the apparatus 500, an orientation or an acceleration/deceleration of the apparatus 500, and a change in temperature of the apparatus 500. The sensor component 514 can include a proximity sensor configured to detect the presence of nearby objects without any physical contact. The sensor component 514 can also include a light sensor, such as a CMOS or CCD image sensor, for use in imaging applications. In some embodiments, the sensor component 514 can also include an accelerometer sensor, a gyroscope sensor, a magnetic sensor, a pressure sensor, or a temperature sensor.

The communication component 516 is configured to facilitate communication, wired or wirelessly, between the apparatus 500 and other devices. The apparatus 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 500 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as instructions included in the memory 504, executable by the processor 520 in the apparatus 500, for performing the above-described methods. For example, the non-transitory computer-readable storage medium can be a ROM, a RAM, a CD-ROM, a magnetic tape, a floppy disc, an optical data storage device, or the like.

When instructions in the non-transitory computer-readable storage medium are executed by the processor of the mobile terminal, the mobile terminal is enabled to perform a method for setting an image capturing parameter. The method includes acquiring current environment data corresponding to a current environment and a device parameter of an image capturing device; and sending a sample acquiring request to a server, the sample acquiring request including the environment data and the device parameter. The method further includes; upon receipt of sample data sent by the server based on the environment data and the device parameter, determining a target image capturing parameter based on at least one sample image included in the sample data; and setting a current image capturing parameter of the image capturing device based the target image capturing parameter.

Optionally, the device parameter of the image capturing device includes an image capturing parameter range supported by the image capturing device or an identification of the image capturing device.

Optionally, determining a target image capturing parameter based on at least one sample image included in the sample data, includes: displaying the at least one sample image; upon receipt of a selection command selecting one of the displayed sample images, identifying a sample image selected by the selection command as a target sample image; acquiring an image capturing parameter of the target sample image; and using an image capturing parameter of the target sample image as the target image capturing parameter.

Optionally, the sample data further includes image capturing guide information corresponding to each of the sample images, the image capturing guide information for the purpose of guiding the capture of an image based on the image capturing parameter of the sample image.

Optionally, after the step of identifying a sample image selected by the selection command as a target sample image, the method further includes displaying the image capturing guide information corresponding to the target sample image.

Optionally, after the step of setting a current image capturing parameter of the image capturing device based on the target image capturing parameter, the method further includes: acquiring an image captured by the image capturing device and corresponding environment data, the image including an image capturing parameter used to capture the image; and sending the image and the corresponding environment data to the server for the server to store as a sample image corresponding to the environment data and the image capturing parameter.

Optionally, after the step of acquiring an image captured by the image capturing device and corresponding environment data, the method further includes: receiving inputted image capturing guide information for the image; and sending the image capturing guide information to the server.

In the embodiments of the present disclosure, it is possible to acquire current environment data and a device parameter of the image capturing device; send a sample acquiring request to a server; upon receipt of sample data sent by the server, determine a target image capturing parameter based on at least one sample image included in the sample data and use the target image capturing parameter as the current image capturing parameter. In this way, since the user does not need to manually set parameters based on experience, the efficiency of setting an image capturing parameter is improved. Moreover, since the sample data is sent by the server based on the environment data corresponding to the current environment and the device parameter of the image capturing device, the target image capturing parameter determined by the sample data is consistent with the current environment and the parameters the image capturing device can support. This can improve the efficiency of determining the current image capturing parameter for the device and improve the image capturing effect of capturing an image with the image capturing device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It should be understood that the present disclosure is not limited to the precise structures that are described above and shown in the accompanying drawings, and that various modifications and changes may be made without departing from the range of the scope thereof. It is intended that the scope of the disclosure should only be limited by the appended claims.

What is claimed is:

1. A method for setting an image capturing parameter of an image capturing device comprising:
   acquiring current environment data that corresponds to a current environment and a device parameter of the image capturing device;
   sending a sample acquiring request to a server, the sample acquiring request including the current environment data and the device parameter;
   receiving sample data from the server associated with the current environment data and the device parameter, the sample data including one or more sample images previously stored on the server;
   determining a target image capturing parameter based on the one or more sample images;
   setting a current image capturing parameter of the image capturing device based on the target image capturing parameter;
   capturing an image with the image capturing device;
   acquiring environment data corresponding to the captured image;
   determining an image capturing parameter used to capture the image; and
   sending the captured image, the acquired environment data, and the image capturing parameter used to capture the image to the server, wherein the server stores the captured image as a sample image corresponding to the acquired environment data and the image capturing parameter used to capture the image.

2. The method of claim 1, wherein the device parameter comprises at least one of an image capturing parameter range supported by the image capturing device or an identification of the image capturing device.

3. The method of claim 1, wherein determining the target image capturing parameter comprises:
   displaying the one or more sample images;
   receiving a selection command that selects a sample image of the displayed sample images;
   identifying a target sample image based on the sample image selected by the selection command;
   acquiring an image capturing parameter corresponding to the target sample image; and
   using the acquired image capturing parameter as the target image capturing parameter.

4. The method of claim 1, wherein the sample data further comprises image capturing guide information corresponding to each of the one or more sample images.

5. The method of claim 4, further comprising: displaying the image capturing guide information corresponding to the target sample image after identifying the target sample image.

6. The method of claim 1, wherein
   the sample acquiring request specifies that the sample data requested corresponds to a picture or a video.

7. The method of claim 6, further comprising: after capturing the image with the image capturing device and acquiring environment data corresponding to the captured image:
   receiving inputted image capturing guide information for the captured image; and
   sending the inputted image capturing guide information to the server.

8. An apparatus for setting an image capturing parameter, comprising:
   a processor; and
   a memory for storing instructions executable by the processor;
   wherein the processor is configured to:
   acquire current environment data that corresponds to a current environment and a device parameter of an image capturing device;
   send a sample acquiring request to a server, the sample acquiring request comprising the current environment data and the device parameter;
   receive sample data from the server associated with the current environment data and the device parameter, the sample data including one or more sample images previously stored on the server;
   determine a target image capturing parameter based on the one or more sample images;
   set a current image capturing parameter of the image capturing device based on the target image capturing parameter;
   capture an image with the image capturing device;
   acquire environment data corresponding to the captured image;
   determine an image capturing parameter used to capture the image; and
   send the captured image, the acquired environment data, and the image capturing parameter used to capture the image to the server, wherein the server stores the captured image as a sample image corresponding to the acquired environment data and the image capturing parameter used to capture the image.

9. The apparatus of claim 8, wherein the device parameter comprises at least one of an image capturing parameter range supported by the image capturing device or an identification of the image capturing device.

10. The apparatus of claim 8, wherein the processor, in determining the target image capturing parameter, is further configured to:
   display the one or more sample images;
   receive a selection command that selects a sample image of the displayed sample images;
   identify a target sample image based on the sample image selected by the selection command;
   acquire an image capturing parameter corresponding to the target sample image; and
   use the acquired image capturing parameter as the target image capturing parameter.

11. The apparatus of claim 8, wherein the sample data further comprises image capturing guide information corresponding to each of the one or more sample images.

12. The apparatus of claim 11, wherein the processor is further configured to display the image capturing guide information corresponding to the target sample image after identifying the target sample image.

13. The apparatus of claim 8, wherein
   the sample acquiring request specifies that the sample data requested corresponds to a picture or a video.

14. The apparatus of claim 13, wherein after capturing the image with image capturing device and acquiring environment data corresponding to the capturing the image, the processor is further configured to:
   receive inputted image capturing guide information for the image; and
   send the inputted image capturing guide information to the server.

15. A non-transitory computer-readable storage medium storing instructions that, when executed by a processor in an apparatus, cause the apparatus to perform a method for setting an image capturing parameter, the method comprising:
   acquiring current environment data that corresponds to a current environment and a device parameter of an image capturing device;
   sending a sample acquiring request to a server, the sample acquiring request including the current environment data and the device parameter;
   receiving sample data from the server associated with the current environment data and the device parameter, the sample data including one or more sample images previously stored on the server;
   determining a target image capturing parameter based on the one or more sample images;
   setting a current image capturing parameter of the image capturing device based on the target image capturing parameter;
   capturing an image with the image capturing device;
   acquiring environment data corresponding to the captured image;
   determining an image capturing parameter used to capture the image; and
   sending the captured image, the acquired environment data, and the image capturing parameter used to capture the image to the server, wherein the server stores the captured image as a sample image corresponding to the acquired environment data and the image capturing parameter used to capture the image.

16. The non-transitory computer-readable storage medium of claim 15, wherein the device parameter comprises at least one of an image capturing parameter range supported by the image capturing device or an identification of the image capturing device.

* * * * *